(12) United States Patent
Sato et al.

(10) Patent No.: US 11,380,140 B2
(45) Date of Patent: Jul. 5, 2022

(54) INSPECTION ASSISTANCE DEVICE, INSPECTION ASSISTANCE METHOD, AND RECORDING MEDIUM

(71) Applicant: NEC CORPORATION, Tokyo (JP)

(72) Inventors: Takami Sato, Tokyo (JP); Kota Iwamoto, Tokyo (JP); Yoshinori Saida, Tokyo (JP); Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 504 days.

(21) Appl. No.: 16/489,149

(22) PCT Filed: Feb. 28, 2017

(86) PCT No.: PCT/JP2017/007754
§ 371 (c)(1),
(2) Date: Aug. 27, 2019

(87) PCT Pub. No.: WO2018/158812
PCT Pub. Date: Sep. 7, 2018

(65) Prior Publication Data
US 2019/0392654 A1    Dec. 26, 2019

(51) Int. Cl.
*G07C 3/14* (2006.01)
*G07C 1/10* (2006.01)
*G05B 23/02* (2006.01)

(52) U.S. Cl.
CPC ........... *G07C 3/14* (2013.01); *G05B 23/0216* (2013.01); *G07C 1/10* (2013.01); *G05B 2219/32014* (2013.01)

(58) Field of Classification Search
CPC ........ G07C 3/14; G07C 1/10; G05B 23/0216; G05B 2219/32014; G06Q 10/0639; G06Q 10/06395; G06Q 10/06398; G06Q 10/20
See application file for complete search history.

(56) References Cited

U.S. PATENT DOCUMENTS

2005/0265584 A1* 12/2005 Dobson ................. G06V 20/40
382/104
2014/0252086 A1* 9/2014 Talley .............. G06Q 10/06398
235/376
(Continued)

FOREIGN PATENT DOCUMENTS

JP    2014-123193 A    7/2014
JP    2014-235704 A    12/2014
(Continued)

OTHER PUBLICATIONS

Written Opinion for PCT/JP2017/007754, dated May 23, 2017.
International Search Report for PCT/JP2017/007754, dated May 23, 2017.

*Primary Examiner* — Manuel L Barbee
(74) *Attorney, Agent, or Firm* — Sughrue Mion, PLLC

(57) ABSTRACT

Provided is a technology for recording effective data, as a result of inspection on a to-be-inspected object. This inspection assistance device is provided with: a reception unit that receives information about a to-be-inspected object; an acquisition unit that acquires image data captured by an imaging device; and a recording control unit that, in the case when the imaging time of the image data falls within a prescribed time range based on the time at which the information was received being set as a reference, and when the to-be-inspected object indicated by the received information coincides with the to-be-inspected object recognized from the image data, records the information pertaining to the result of inspection on the to-be-inspected object and the information about the to-be-inspected object in association with each other.

11 Claims, 16 Drawing Sheets

(56) References Cited

U.S. PATENT DOCUMENTS

| | | | |
|---|---|---|---|
| 2018/0049028 A1* | 2/2018 | Tali | G06F 21/40 |
| 2019/0096138 A1* | 3/2019 | Bare | G06V 20/10 |
| 2019/0164270 A1* | 5/2019 | Wardell | G06N 20/00 |

FOREIGN PATENT DOCUMENTS

| | | |
|---|---|---|
| JP | 2015-005181 A | 1/2015 |
| JP | 2016-206825 A | 12/2016 |
| WO | 2012/046726 A1 | 4/2012 |
| WO | 2012/049795 A1 | 2/2014 |

\* cited by examiner

Fig.6

| INSPECTION ITEM NUMBER | INSPECTION ITEM | INSPECTION TARGET NAME | INSPECTION TARGET POSITION |
|---|---|---|---|
| 1 | MEASURE TEMPERATURE | THERMOMETER 31 | (LATITUDE xx1, LONGITUDE yy1) |
| 2 | CHECK WHETHER SWITCH IS ON | SWITCH 32 | (LATITUDE xx2, LONGITUDE yy2) |
| ... | ... | ... | ... |

61 INSPECTION ITEM NUMBER
62 INSPECTION ITEM
63 INSPECTION TARGET NAME
64 INSPECTION TARGET POSITION
60 INSPECTION TARGET INFORMATION

Fig.7

| INSPECTION ITEM NUMBER | INSPECTION ITEM | INSPECTION TARGET NAME | INSPECTION TARGET POSITION | INSPECTION RESULT INFORMATION |
|---|---|---|---|---|
| 1 | MEASURE TEMPERATURE | THERMOMETER 31 | (LATITUDE xx1, LONGITUDE yy1) | IMAGE DATA dd1 |
| 2 | CHECK WHETHER SWITCH IS ON | SWITCH 32 | (LATITUDE xx2, LONGITUDE yy2) | IMAGE DATA dd1 |
| ... | ... | ... | ... | ... |

61 / 62 / 63 / 64 / 75

70 RECORDED INFORMATION

Fig.12

121 INSPECTION TARGET INFORMATION

| INSPECTION ITEM NUMBER | INSPECTION ITEM | INSPECTION TARGET NAME | REQUIRED TIME |
| --- | --- | --- | --- |
| 3 | (1) MEASURE TEMPERATURE OF THERMOMETER 31<br>(2) CHECK WHETHER SWITCH 32 IS ON | THERMOMETER 31<br>SWITCH 32 | – |
| 4 | (1) MEASURE TEMPERATURE OF THERMOMETER 31<br>(2) MEASURE TEMPERATURE OF THERMOMETER X<br>(3) MEASURE HUMIDITY OF HYGROMETER Y | THERMOMETER 31<br>THERMOMETER X<br>HYGROMETER Y | 5 MINUTES |
| 5 | CHECK WHETHER SWITCH Z IS ON | SWITCH Z | 2 MINUTES |
| 6 | CHECK STATE | XX BRIDGE | – |
| ... | ... | ... | ... |

122 — INSPECTION ITEM NUMBER
123 — INSPECTION ITEM
124 — INSPECTION TARGET NAME
125 — REQUIRED TIME

Fig.15

| INSPECTION ITEM NUMBER | INSPECTION ITEM | INSPECTION TARGET NAME | REQUIRED TIME | INSPECTION RESULT INFORMATION |
|---|---|---|---|---|
| 3 | (1) MEASURE TEMPERATURE OF THERMOMETER 31<br>(2) CHECK WHETHER SWITCH 32 IS ON | THERMOMETER 31<br>SWITCH 32 | – | IMAGE DATA dd1 |
| 4 | (1) MEASURE TEMPERATURE OF THERMOMETER 31<br>(2) MEASURE TEMPERATURE OF THERMOMETER X<br>(3) MEASURE HUMIDITY OF HYGROMETER Y | THERMOMETER 31<br>THERMOMETER X<br>HYGROMETER Y | 5 MINUTES | IMAGE DATA dd2<br>IMAGE DATA dd3<br>IMAGE DATA dd4 |
| 5 | CHECK WHETHER SWITCH Z IS ON | SWITCH Z | 2 MINUTES | VOICE DATA ss1 |
| 6 | CHECK STATE | XX BRIDGE | – | IMAGE DATA dd5<br>IMAGE DATA dd6<br>VOICE DATA ss2 |
| ... | ... | ... | ... | ... |

151 RECORDED INFORMATION

INSPECTION ASSISTANCE DEVICE, INSPECTION ASSISTANCE METHOD, AND RECORDING MEDIUM

CROSS REFERENCE TO RELATED APPLICATIONS

This application is a National Stage of International Application No. PCT/JP2017/007754 filed Feb. 28, 2017.

TECHNICAL FIELD

The present disclosure relates to an inspection assistance device, an inspection assistance method, and a recording medium.

BACKGROUND ART

Methods of assisting inspection work on equipment such as a measuring instrument are disclosed. For example, PTL 1 describes an inspection assistance device recognizing identification information and a measured value of a measuring instrument, based on image information of the measuring instrument captured by a camera, and storing the measured value into a storage unit in association with the identification information of the measuring instrument.

Further, PTL 2 describes a substrate production assistance system displaying, when a plurality of recognition targets exist in a visual field of a worker, production information indicating availability or the like of the plurality of recognition targets in association with identification markers in the visual field of the worker on a one-to-one basis in the proximity of the identification marker.

Further, PTL 3 describes an example of a technology for superimposing a virtual object on a photographed image in which a page in a book is photographed and displaying the resulting image by using an augmented reality technology.

CITATION LIST

Patent Literature

PTL 1: International Application Publication No. WO 2012/046726
PTL 2: Japanese Unexamined Patent Application Publication No. 2014-235704
PTL 3: International Application Publication No. WO 2012/049795

SUMMARY OF INVENTION

Technical Problem

An inspection target may not be properly inspected due to a poor attitude of a worker such as the worker not performing work on the inspection target at a predetermined time or not performing work on a predetermined inspection target. For example, when a worker pretends to replace an image of the inspection target captured at present with an image of an inspection target captured in the past, a technology related to aforementioned PTL 1 may cause storing the image into a storage unit as a correct inspection result.

The present disclosure has been made in view of the aforementioned problem, and an object of the present disclosure is to provide a technology capable of efficiently recording data valid as an inspection result of an inspection target.

Solution to Problem

An inspection assistance device according to an aspect of the present disclosure includes an acceptance means configured to accept information about an inspection target, an acquisition means configured to acquire image data captured by an imaging device, and a recording control means configured to, when an imaging time of the image data is within a predetermined time range with reference to an acceptance time of the information, and an inspection target indicated by the accepted information matches an inspection target recognized from the acquired image data, record information about an inspection result of the inspection target and information about the inspection target in association with each other.

Further, an inspection assistance method according to an aspect of the present disclosure includes accepting information about an inspection target, acquiring image data captured by an imaging device, and, when an imaging time of the image data is within a predetermined time range with reference to an acceptance time of the information, and an inspection target indicated by the accepted information matches an inspection target recognized from the acquired image data, recording information about an inspection result of the inspection target and information about the inspection target in association with each other.

A computer program providing the aforementioned device or method by a computer, and a computer-readable non-transitory recording medium storing the computer program also fall under the category of the present disclosure.

Advantageous Effects of Invention

The present disclosure can efficiently record data valid as an inspection result of an inspection target.

BRIEF DESCRIPTION OF DRAWINGS

FIG. 6 is a diagram illustrating an example of inspection target information stored in a storage device.
FIG. 7 is a diagram illustrating an example of recorded information recorded in a recording unit.
FIG. 12 is a diagram illustrating another example of inspection target information stored in the storage device.

FIG. 15 is a diagram illustrating another example of recorded information recorded in the recording unit.

EXAMPLE EMBODIMENT

First Example Embodiment

Figure 1:
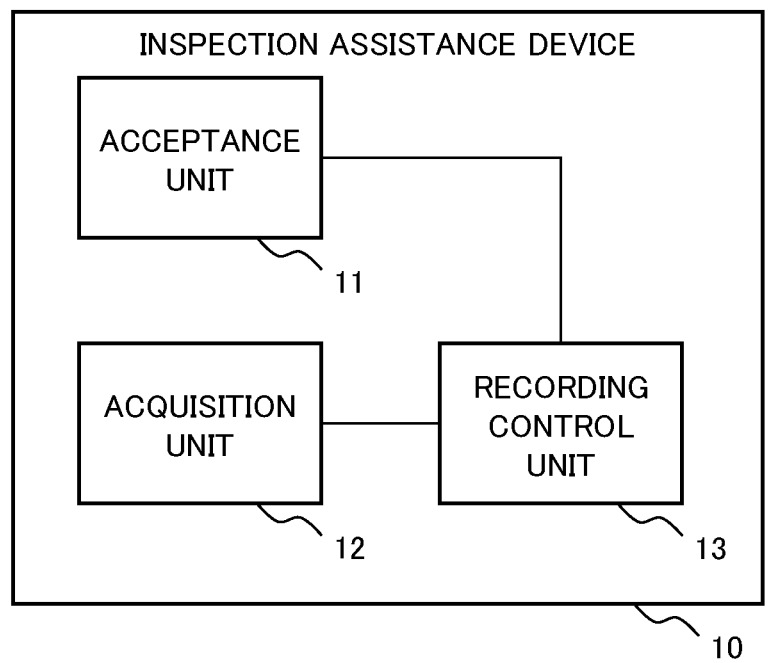
FIG. 1 is a functional block diagram illustrating an example of a functional configuration of an inspection assistance device according to a first example embodiment.
Figure 2:
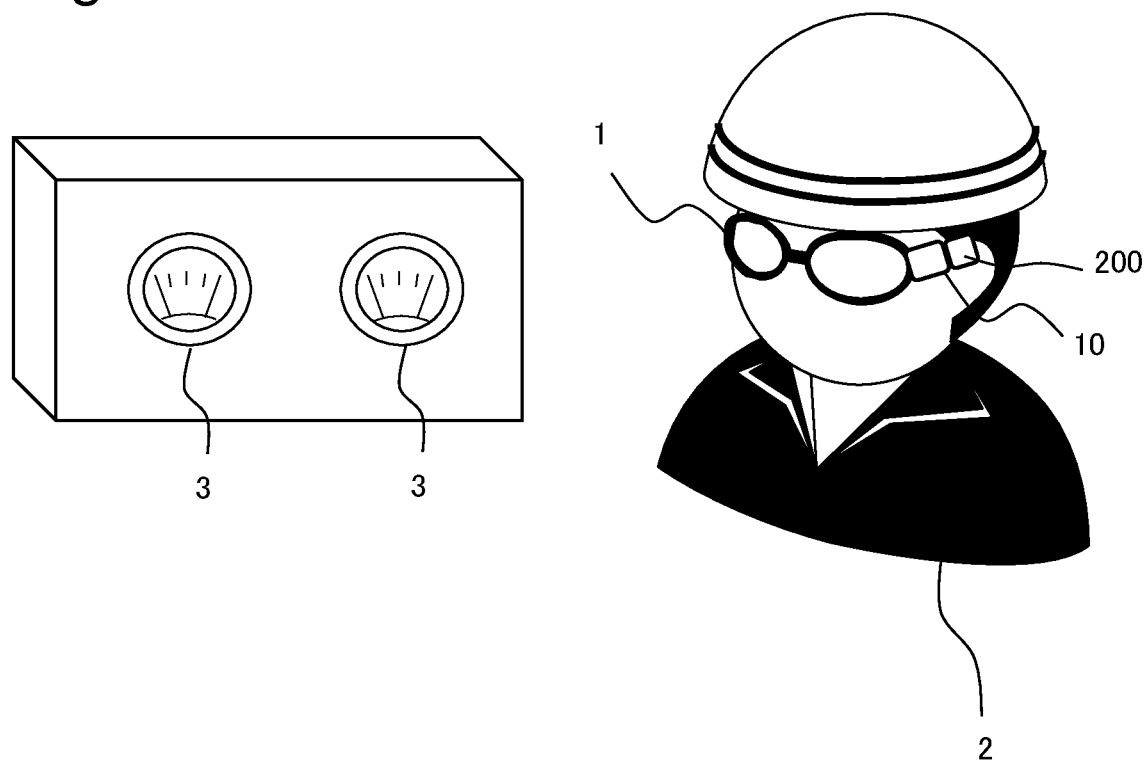
FIG. 2 is a diagram illustrating an application example of the inspection assistance device illustrated in FIG. 1.

A first example embodiment of the present disclosure will be described with reference to drawings. FIG. 1 is a functional block diagram illustrating an example of a functional configuration of an inspection assistance device 10 according to the present example embodiment. FIG. 2 is a diagram illustrating an application example of the inspection assistance device 10 illustrated in FIG. 1. For example, the inspection assistance device 10 is equipped on a glasses type wearable terminal as illustrated in FIG. 2. The glasses type wearable terminal is hereinafter referred to as wearable glasses 1. For example, when a worker 2 wearing the wearable glasses 1 turns his/her face in a direction of an inspection target 3 such as a measuring instrument, an imaging device 200 equipped on the wearable glasses 1 captures an image of the inspection target 3. While the inspection assistance device 10 according to the present example embodiment is described on an assumption that the inspection assistance device 10 is equipped on the wearable glasses 1, the inspection assistance device 10 may be provided by a device communicable with the wearable glasses 1.

As illustrated in FIG. 1, the inspection assistance device 10 according to the present example embodiment includes an acceptance unit 11, an acquisition unit 12, and a recording control unit 13.

The acceptance unit 11 accepts information about an inspection target 3. For example, information about an inspection target 3 includes an inspection item for the inspection target 3, an inspection target name indicating the inspection target 3, an inspection target position indicating a position related to the inspection target 3, a start time of an inspection of the inspection target 3, and a required time required for inspection of the inspection target 3 but is not limited to the above. The acceptance unit 11 provides the accepted information about the inspection target 3 for the recording control unit 13.

The acceptance unit 11 may accept information about an inspection target 3 from, for example, a storage device storing the information about the inspection target 3. Further, for example, the acceptance unit 11 may accept information about an inspection target 3 input through an input device by a supervisor inspecting an inspection result, or the like.

The acquisition unit 12 acquires image data captured by the imaging device 200. For example, the imaging device 200 is a camera including a lens and an imaging element. The acquisition unit 12 acquires image data representing an image captured by the imaging device 200. The captured image includes an inspection target 3. Further, an image may be a dynamic image or a static image. Specifically, image data may include data of a plurality of frames constituting a dynamic image or may be static image data representing a static image. In a configuration in which the inspection assistance device 10 is built into the wearable glasses 1 as is the case with the present example embodiment, the acquisition unit 12 may include the function of the imaging device 200. The acquisition unit 12 provides the acquired image data for the recording control unit 13.

The recording control unit 13 sets an acceptance time of information about an inspection target 3 by the acceptance unit 11 as a reference and determines whether or not an imaging time of image data acquired by the acquisition unit 12 is within a predetermined time range from the reference. At this time, the recording control unit 13 may determine whether or not an imaging start time of image data is within a predetermined time range from the reference or may determine whether or not the predetermined time range is included in the imaging time of the image data.

Further, the recording control unit 13 determines whether or not an inspection target 3 indicated by the accepted information matches an inspection target 3 recognized from the acquired image data. When an imaging time of the image data is within the predetermined time range with reference to the acceptance time of the information, and an inspection target 3 indicated by the accepted information matches an inspection target 3 recognized from the acquired image data, the recording control unit 13 records information about an inspection result of the inspection target 3 and the information about the inspection target 3 in association with each other.

The recording control unit 13 records information about an inspection result of an inspection target 3 and information about the inspection target 3 that are associated with each other into, for example, a recording medium such as a hard disk drive or paper. Information about an inspection result may be the inspection result itself or may be data by which the inspection result can be acquired. For example, when an inspection target 3 is a thermometer, the recording control unit 13 may set temperature as information about an inspection result. Further, for example, when an inspection target 3 is a thermometer, the recording control unit 13 may set information indicating whether or not temperature is within a predetermined range as information about an inspection result. For example, when an inspection target 3 is a thermometer, the recording control unit 13 may identify an image by which temperature of the thermometer can be recognized and set image data representing the image as information about an inspection result. Further, the recording control unit 13 may set image data themselves including an inspection target 3 as information about an inspection result. Further, the recording control unit 13 may set an inspection result input by a user by use of an input device or the like as information about an inspection result.

Figure 3:
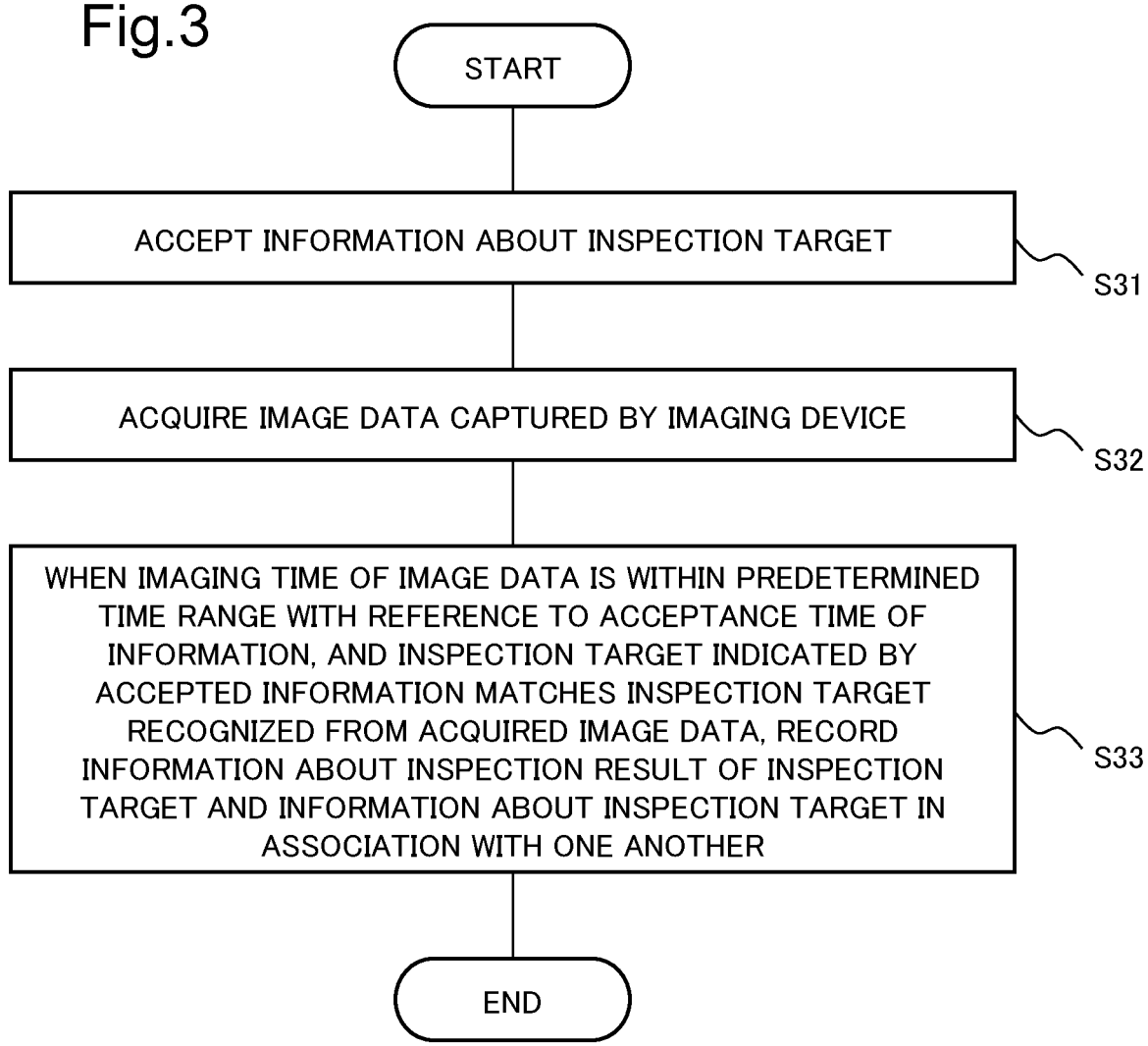
FIG. 3 is a flowchart illustrating an example of a processing flow in the inspection assistance device according to the first example embodiment.

FIG. 3 is a flowchart illustrating an example of a processing flow in the inspection assistance device 10 according to the present example embodiment. As described in FIG. 3, the acceptance unit 11 accepts information about an inspection target (Step S31). Further, the acquisition unit 12 acquires image data captured by the imaging device 200 (Step S32). Then, when an imaging time of the image data is within a predetermined time range with reference to an acceptance time of the information, and the inspection target indicated by the accepted information matches an inspection target recognized from the acquired image data, the recording control unit 13 records information about an inspection result of the inspection target and the information about the inspection target in association with each other (Step S33).

Thus, when an imaging time of image data is within a predetermined time range with reference to an acceptance time of information, and an inspection target indicated by the accepted information matches an inspection target recognized from acquired image data, the inspection assistance device 10 according to the present example embodiment records information about an inspection result of the inspection target and the information about the inspection target in association with each other. Accordingly, for example, when the acquisition unit 12 acquires an image of an inspection target captured in the past instead of when the inspection target is inspected, the recording control unit 13 does not record an inspection result of the inspection target included in the image captured in the past even when the image includes the inspection target.

Further, even in a case of an imaging time of image data being within a predetermined time range with reference to an acceptance time of information, when a worker captures an image of a target different from an inspection target, the inspection target is not recognized from the captured image data. Accordingly, in such a case, even when the worker 2 inputs an inspection result by use of an input device or the like, the recording control unit 13 does not record an inspection result of the inspection target.

Thus, the inspection assistance device 10 according to the present example embodiment can efficiently record data valid as an inspection result of an inspection target. Consequently, for example, even when image data, information about an inspection result, or the like is falsified due to a poor attitude of a worker or the like, recording of the falsified data can be prevented.

Further, for example, a supervisor checking inspection work by use of recorded data can check data valid as an inspection result of an inspection target. Accordingly, the inspection assistance device 10 can more efficiently assist work related to inspection.

Second Example Embodiment

Figure 4:
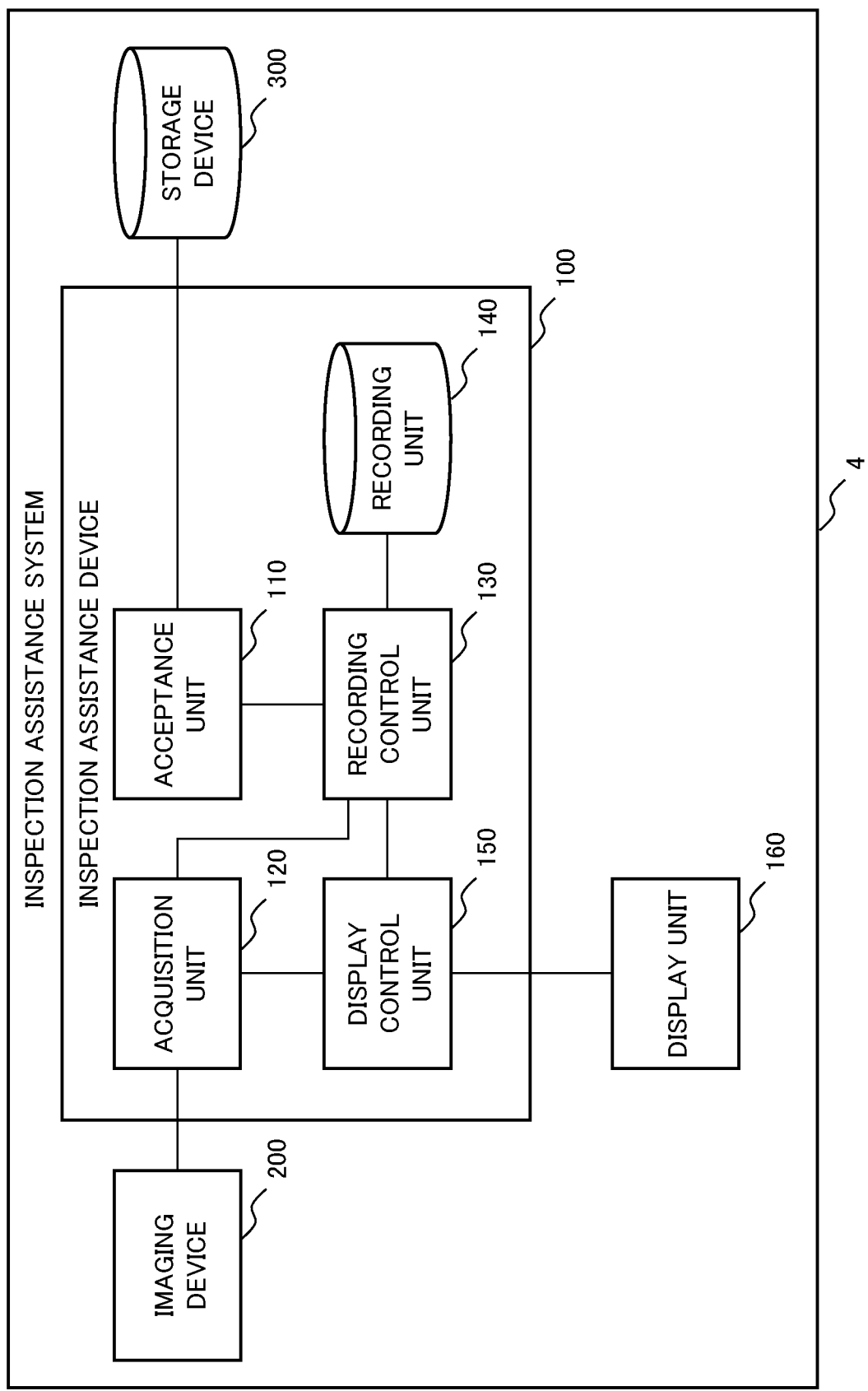
FIG. 4 is a diagram illustrating a configuration example of an inspection assistance system including an inspection assistance device according to a second example embodiment.
Figure 5:
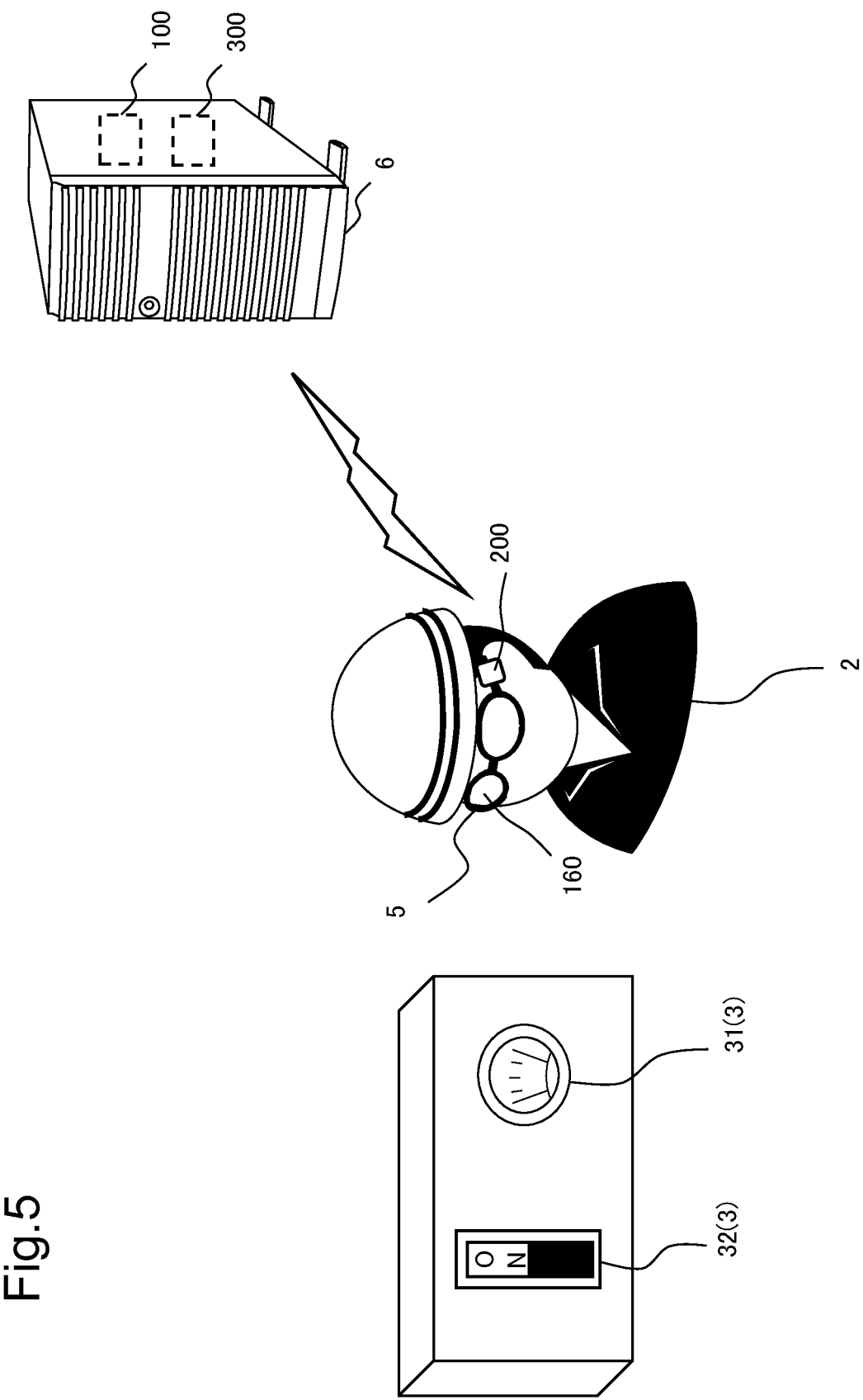
FIG. 5 is a diagram illustrating an application example of the inspection assistance system illustrated in FIG. 4.

Next, a second example embodiment of the present disclosure based on the aforementioned first example embodiment will be described with reference to drawings. FIG. 4 is a diagram illustrating a configuration example of an inspection assistance system 4 including an inspection assistance device 100 according to the present example embodiment. As illustrated in FIG. 4, the inspection assistance system 4 includes the inspection assistance device 100, an imaging device 200, a storage device 300, and a display unit 160. FIG. 5 is a diagram illustrating an application example of the inspection assistance system 4 illustrated in FIG. 4. The imaging device 200 may be equipped on wearable glasses 5, and the inspection assistance device 100 and the storage device 300 may be equipped on a server device 6 communicable with the wearable glasses 5, as illustrated in FIG. 5. For example, when a worker 2 wearing the wearable glasses 5 turns his/her face toward an inspection target 3 such as a measuring instrument, the imaging device 200 on the wearable glasses 5 captures an image of the inspection target 3. The captured image is displayed on the display unit 160 being a lens part of the wearable glasses 5.

For example, an inspection target 3 is a sensor, such as a thermometer, a switch, a structure, or the like being a target of inspection. An inspection target 3 is not particularly limited as long as the inspection target 3 serves as an inspection target. The inspection target 3 according to the present example embodiment will be described on an assumption that the inspection target 3 is composed of a thermometer 31 and a switch 32. The inspection target 3 may be an entire device including the thermometer 31 and the switch 32.

The inspection assistance device 100 and the storage device 300 may be equipped on the wearable glasses 5, or part of functions of the inspection assistance device 100 (for example, a display control unit 150 illustrated in FIG. 4) may be equipped on the wearable glasses 5.

The storage device 300 stores information about an inspection target 3. FIG. 6 illustrates an example of information about an inspection target 3 stored by the storage device 300. FIG. 6 is a diagram illustrating an example of information about an inspection target 3 (inspection target information 60) stored by the storage device 300. As illustrated in FIG. 6, for example, each record in the inspection target information 60 includes an inspection item number 61 for identifying an inspection item, an inspection item 62 for the inspection target 3, an inspection target name 63 indicating the inspection target 3, and an inspection target position 64 indicating a position related to the inspection target 3. The inspection target position 64 may be a position where the inspection target 3 is installed or a position of the imaging device 200 capturing an image of the inspection target 3. The inspection target position 64 has only to be a position by which the inspection target 3 can be identified. For example, without being limited to the above, the inspection target information 60 may include an identifier for identifying the inspection target 3 and an inspection time of the inspection target 3 and may not include the inspection target position 64.

The imaging device 200 captures an image of an inspection target 3 and generates image data representing the captured image. The generated image data may be stored in the imaging device 200 or may be stored in a storage device different from the imaging device 200. An image captured by the imaging device 200 may be a dynamic image or a static image. Further, image data include time information indicating a time when the image is captured. Upon generating image data, the imaging device 200 may provide the image data for the inspection assistance device 100.

Next, a configuration of the inspection assistance device 100 will be described. As illustrated in FIG. 4, the inspection assistance device 100 includes an acceptance unit 110, an acquisition unit 120, a recording control unit 130, a recording unit 140, and a display control unit 150. The recording unit 140 may be included in the storage device 300 or may be provided by a storage device different from the storage device 300.

The acceptance unit 110 is an example of the acceptance unit 11 according to the first example embodiment. The acceptance unit 110 accepts information about an inspection target 3 stored in the storage device 300. For example, the acceptance unit 110 may accept information about an inspection target 3, based on input information input from an input device. For example, in a case of the input device being a device capable of inputting text, triggered by acceptance of an inspection item number, the acceptance unit 110 may identify an inspection item number 61 identical to the accepted inspection item number and acquire a record related to the identified inspection item number 61 from the storage device 300. Further, for example, in a case of the input device being a sound collecting device such as a microphone, triggered by collection of voice, the acceptance unit 110 may acquire a record related to an inspection item number or an inspection target name recognized from the collected voice from the storage device 300. Further, in a case of input information being input from the input device is information indicating a position of an inspection target, the acceptance unit 110 may compare the position with an inspection target position 64 and acquire a record related to the closest position. Further, in a case of the inspection target information 60 including an identifier for identifying an inspection target 3 or an inspection time of the inspection target 3, when input information input from the input device is an identifier or an inspection time, the acceptance unit 110 may acquire a record identified based on the input information.

The acceptance unit 110 provides accepted information about an inspection target 3 for the recording control unit 130 along with an acceptance time of the information about the inspection target 3.

The acquisition unit 120 is an example of the acquisition unit 12 according to the first example embodiment. The acquisition unit 120 acquires image data captured by the imaging device 200. The acquisition unit 120 may acquire image data from the imaging device 200 or may acquire image data from a storage device. Further, the acquisition unit 120 may acquire entire image data captured by the imaging device 200 or may acquire part of the image data. By the acquisition unit 120 acquiring part of image data captured by the imaging device 200, an amount of data can be reduced compared with a case of acquiring the entire image data. The acquisition unit 120 provides acquired image data for the recording control unit 130.

The recording control unit 130 is an example of the recording control unit 13 according to the first example embodiment. When an imaging time of image data is within a predetermined time range with reference to an acceptance time of information about an inspection target 3, and the inspection target 3 indicated by the accepted information matches an inspection target 3 recognized from acquired image data, the recording control unit 130 records information about an inspection result of the inspection target 3 and the information about the inspection target 3 in association with each other. The recording control unit 130 receives, from the acceptance unit 110, information about an inspection target 3 along with an acceptance time of the information about the inspection target 3. Further, the recording control unit 130 receives image data from the acquisition unit 120. The recording control unit 130 determines whether or not a time indicated by time information included in the image data is within the predetermined time range with reference to the acceptance time of the information about the inspection target 3.

Further, the recording control unit 130 recognizes which inspection target 3 a target included in image data is. A recognition method performed by the recording control unit 130 is not particularly limited, and an arbitrary method may be used. Further, the recording control unit 130 may be configured to accept a recognition result from a device performing the recognition described above, or the like. The recording control unit 130 determines whether or not the recognized inspection target 3 matches an inspection target 3 indicated by the accepted information. When an imaging time of the image data is within the predetermined time range with reference to the acceptance time of the information about the inspection target 3, and the inspection target 3 indicated by the accepted information matches the inspection target 3 recognized from the acquired image data, the recording control unit 130 records information about an inspection result of the inspection target 3 and the information about the inspection target 3 in association with each other into, for example, the recording unit 140. While it is assumed that the recording control unit 130 according to the present example embodiment records the associated information into the recording unit 140, the recording control unit 130 may be configured to record the associated information by outputting the information to paper, the display unit 160, or another medium.

For example, the recording unit 140 is provided by a hard disk drive. The recording unit 140 records information about an inspection result and information about an inspection target 3 associated to each other by the recording control unit 130.

Information recorded in the recording unit 140 will be described with reference to FIG. 7. FIG. 7 is a diagram illustrating an example of recorded information 70 recorded in the recording unit 140. As illustrated in FIG. 7, each record in the recorded information 70 includes an inspection item number 61, an inspection item 62, an inspection target name 63, and an inspection target position 64 constituting inspection target information 60, and inspection result information 75 being information about an inspection result of an inspection target 3 and being associated with the inspection target information 60.

The inspection result information 75 being information about an inspection result of an inspection target 3 may be the inspection result itself or data by which the inspection result can be acquired. For example, it is assumed that image data acquired by the acquisition unit 120 are image data dd1, and an inspection target 3 being included in the image data dd1 and being recognized by the recording control unit 130 is composed of a thermometer 31 and a switch 32. In this case, the inspection result information 75 may be the image data dd1 themselves, as described in FIG. 7. The recording control unit 130 may record, as inspection result information 75, image data representing an image of the thermometer 31 part from an image included in the image data dd1, in association with information about the thermometer 31.

Further, for example, the recording control unit 130 may set information input from an input device accepting input of information about an inspection result as inspection result information 75. For example, when the input device is a device capable of inputting text, the input device may accept temperature as information about an inspection result of the thermometer 31. Then, the recording control unit 130 may record the accepted temperature as inspection result information 75. Further, for example, when the input device is a sound collecting device such as a microphone, the input device may collect voice of a worker reading out temperature indicated by the thermometer 31. Then, the recording control unit 130 may record voice data of the collected voice as inspection result information 75.

Further, the recording control unit 130 may recognize an inspection result of an inspection target 3 from image data by a predetermined method and record the recognized result as inspection result information 75. The recording control unit 130 may record at least one item out of image data, voice data, and a recognized result as inspection result information 75.

Information about an inspection target 3 included in the recorded information 70 has only to be information by which the inspection target 3 can be identified and, for example, may be an inspection item number 61 alone.

The display control unit 150 causes the display unit 160 to display image data acquired by the acquisition unit 120. Further, the display control unit 150 may cause the display unit 160 to display inspection result information 75. Further, the display control unit 150 may cause the display unit 160 to display information about a determination result by the recording control unit 130. Further, the display control unit 150 may cause a display device different from the display unit 160 to display recorded information 70 and information about a determination result by the recording control unit 130.

For example, as illustrated in FIG. 5, the display unit 160 is a lens part of the wearable glasses 5 and is provided by, for example, a display module transmitting external light and displaying information in accordance with an instruction from the display control unit 150 but is not limited to the above. The display unit 160 may be a module having a function of displaying information generated by the display control unit 150 on a retina of the worker 2. Thus, the display unit 160 may have a function of projecting information generated by the display control unit 150, in accordance with control by the display control unit 150. The function of projecting information generated by the display control unit 150 may be included in the display control unit 150. For example, assuming that the display unit 160 is a retina, the display control unit 150 may have a function of directly projecting generated information on the retina.

Figure 8:
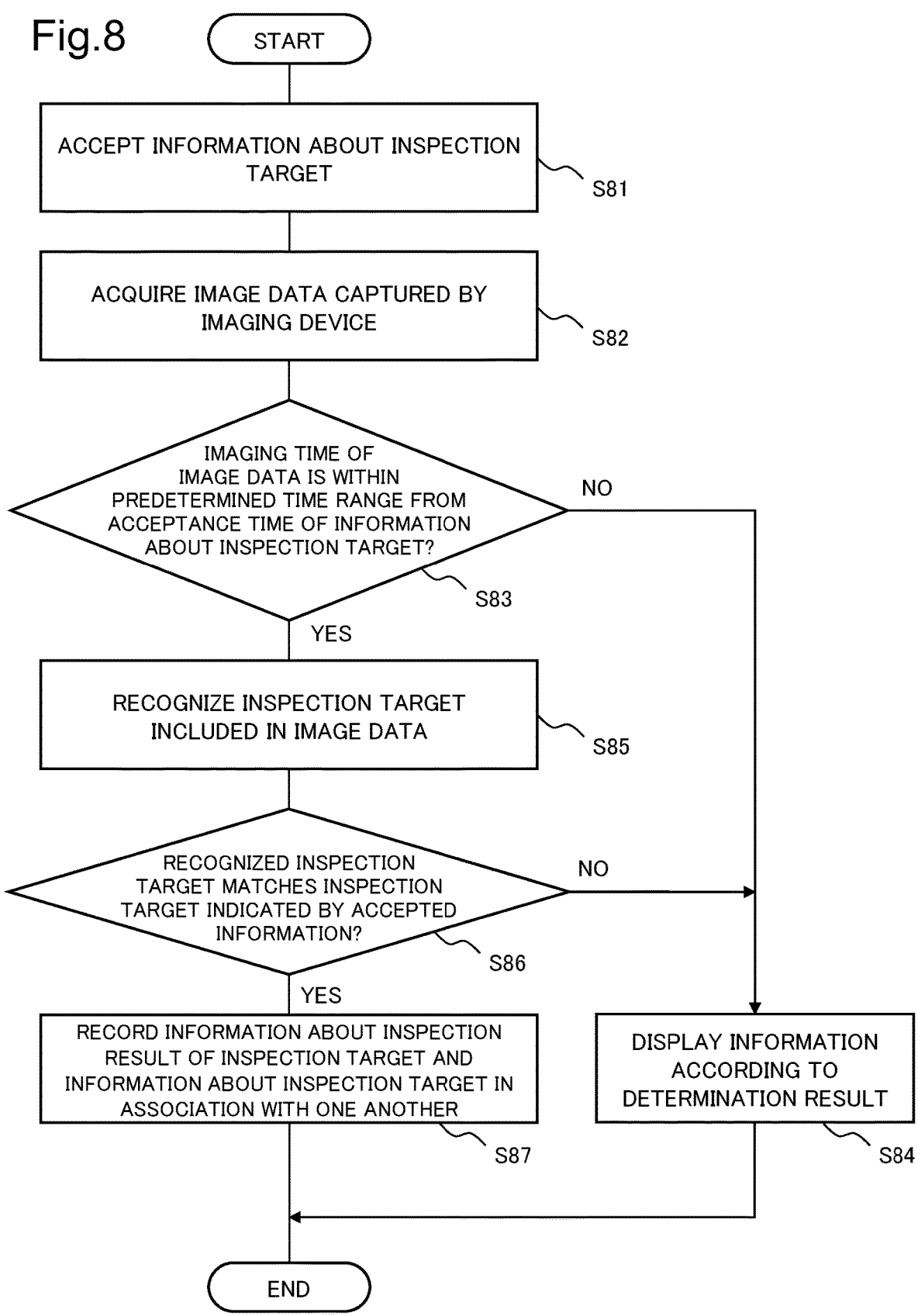
FIG. 8 is a flowchart illustrating an example of a processing flow in the inspection assistance device according to the second example embodiment.

FIG. 8 is a flowchart illustrating an example of a processing flow in the inspection assistance device 100 according to the present example embodiment. As described in FIG. 8, the acceptance unit 110 accepts information about an inspection target 3 (Step S81). Further, the acquisition unit 120 acquires image data captured by the imaging device 200 (Step S82). Step S81 and Step S82 may be performed simultaneously or may be performed in reverse order.

Next, the recording control unit 130 determines whether or not an imaging time indicated by time information included in the image data is within a predetermined time range with reference to an acceptance time of the information about the inspection target 3 (Step S83). When the imaging time indicated by the time information included in the image data is not within the predetermined time range with reference to the acceptance time of the information about the inspection target 3 (NO in Step S83), the display control unit 150 causes the display unit 160 and/or a display device different from the display unit 160 to display information according to the determination result (Step S84). Then, the inspection assistance device 100 ends the processing. Step S84 may not be performed. The information according to the determination result displayed in Step S84 will be described later in a separate drawing.

When the imaging time indicated by the time information included in the image data is within the predetermined time range with reference to the acceptance time of the information about the inspection target 3 (YES in Step S83), the recording control unit 130 recognizes which inspection target 3 a target included in the image data is (Step S85). Then, the recording control unit 130 determines whether or not the recognized inspection target 3 matches the inspection target 3 indicated by the accepted information (Step S86). Step S85 and Step S86 may be performed before Step S84.

When the inspection target 3 indicated by the accepted information does not match the inspection target 3 recognized from the acquired image data (NO in Step S86), the display control unit 150 causes the display unit 160 and/or the display device different from the display unit 160 to display information according to the determination result (Step S84). Then, the inspection assistance device 100 ends the processing.

When the inspection target 3 indicated by the accepted information matches the inspection target 3 recognized from the acquired image data (YES in Step S86), the recording control unit 130 records information about an inspection result of the inspection target 3 and the information about the inspection target 3 in association with each other into the recording unit 140 (Step S87). The above concludes the processing by the inspection assistance device 100.

The information according to the determination result, the information being displayed on the display unit 160 and/or the display device different from the display unit 160 in Step S84, will be described with reference to FIG. 9. It is assumed in the description that the information according to the determination result is displayed on the display unit 160 on the wearable glasses 5. For example, when the worker 2 provides an image captured in the past for the inspection assistance device 100 as an image captured at the inspection time, the recording control unit 130 determines that an imaging time indicated by time information included in the image data is not within the predetermined time range with reference to the acceptance time of the information about the inspection target 3 in Step S83. According to the determination result, for example, the display control unit 150 causes the display unit 160 to display a display screen 92 including information 91 prompting the worker 2 to capture an image of the inspection target 3, as illustrated in FIG. 9.

Figure 9:
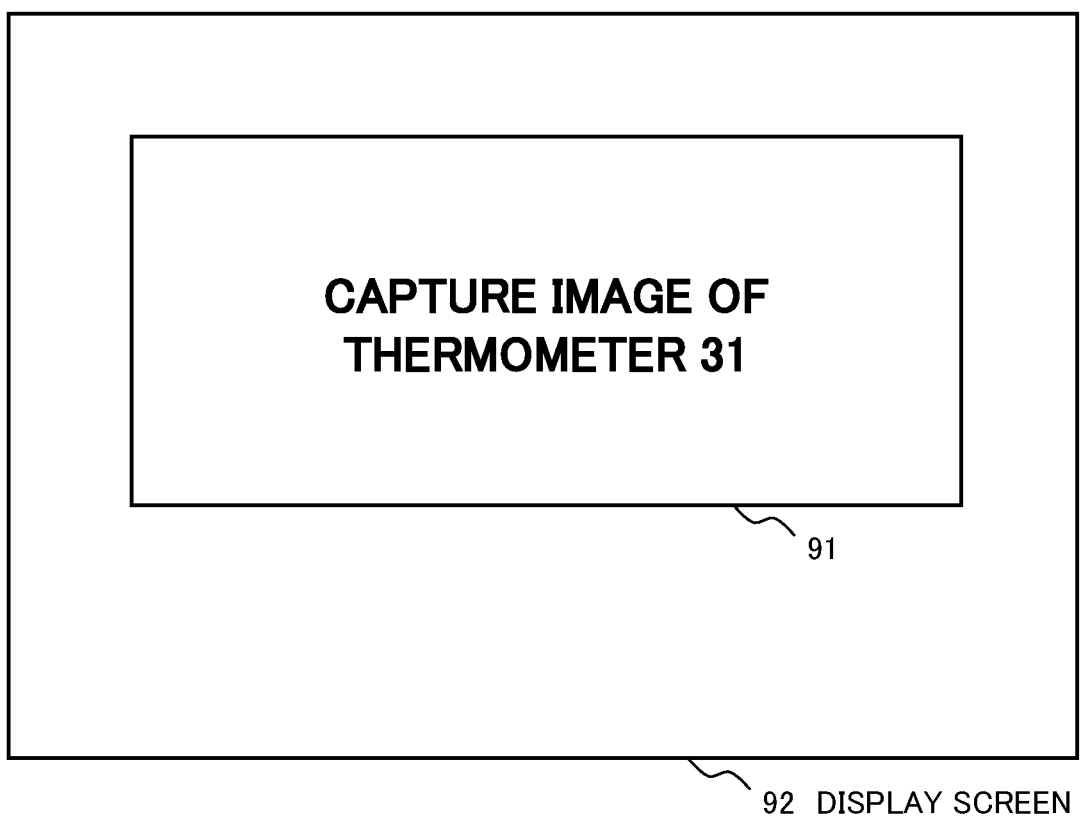
FIG. 9 is a diagram illustrating an example of a display screen displayed by a display unit.

Similarly, when the inspection target 3 indicated by the accepted information does not match the inspection target 3 recognized from the acquired image data (NO in Step S86), for example, the display control unit 150 may display the display screen 92 as illustrated in FIG. 9. The display control unit 150 may cause the display unit 160 to display different display screens between the case of not being within the predetermined time range and the case of a mismatch between the inspection targets.

As described above, the recording control unit 130 does not record information into the display unit 160 in the case of NO in Step S83 and in the case of NO in Step S86. Accordingly, the information 91 illustrated in FIG. 9 being an example of information according to the determination result in Step S84 or information according to the determination result in Step S86 may be reworded as recording result information according to a recording result.

The display control unit 150 may display information different from information displayed on the display unit 160 on the wearable glasses 5, on, for example, a display device of a supervisor operating the inspection assistance device 100. For example, the display control unit 150 may cause the display unit 160 to display the display screen 92 prompting image capture as illustrated in FIG. 9 described above and cause the display device of the supervisor to display a screen notifying that the worker 2 does not capture an image.

Further, the display control unit 150 may cause a screen including an instruction prompting image capture of the inspection target 3 to be displayed until the imaging time is within the predetermined time range, and the inspection target indicated by the accepted information matches the recognized inspection target. Specifically, the display control unit 150 may continue to display the display screen 92 prompting image capture of the inspection target 3 on the display unit 160 on the wearable glasses 5 until the worker 2 captures an image of the inspection target 3. Consequently, the inspection assistance device 100 can assist in making the worker 2 perform inspection work of the inspection target 3.

After Step S87 ends, the display control unit 150 may cause the display unit 160 and/or the display device different from the display unit 160 to display recording completion information (recording result information) indicating that the information about the inspection result and the information about the inspection target 3 are recorded in association with each other. An example of the recording completion information displayed by the display control unit 150 will be described by using FIG. 10 and FIG. 11.

Figure 10:
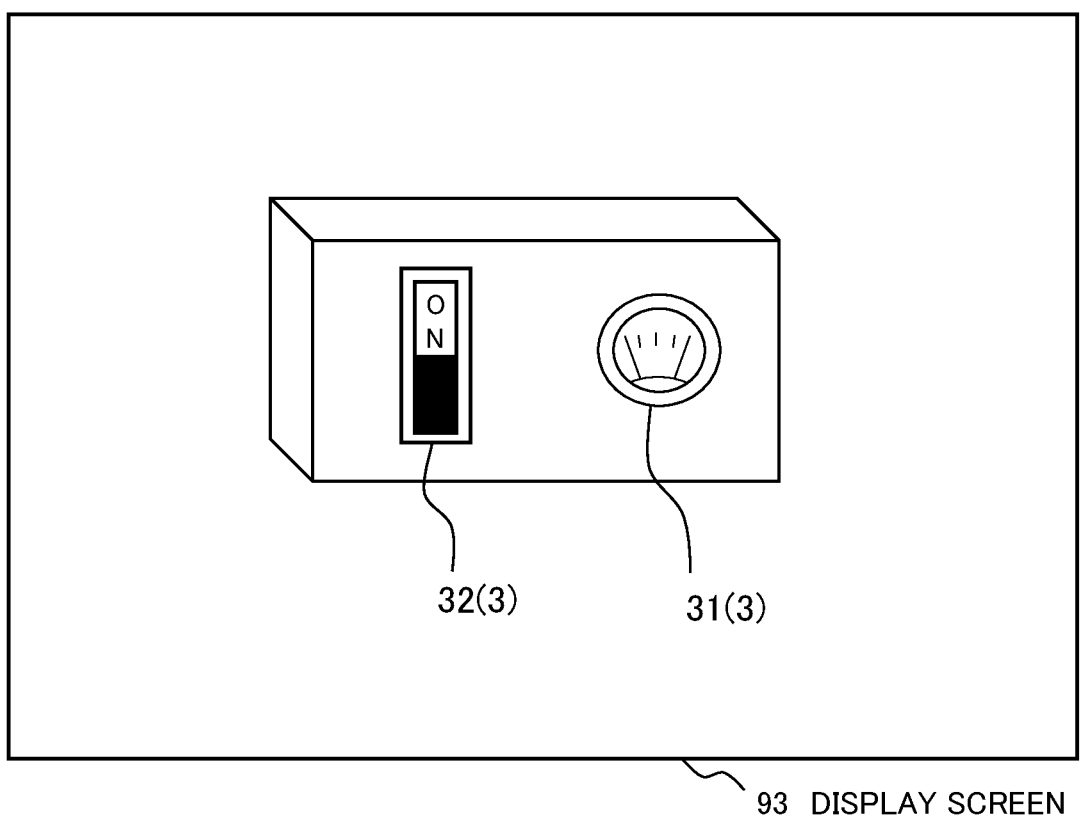
FIG. 10 is a diagram illustrating another example of a display screen displayed by the display unit.
Figure 11:
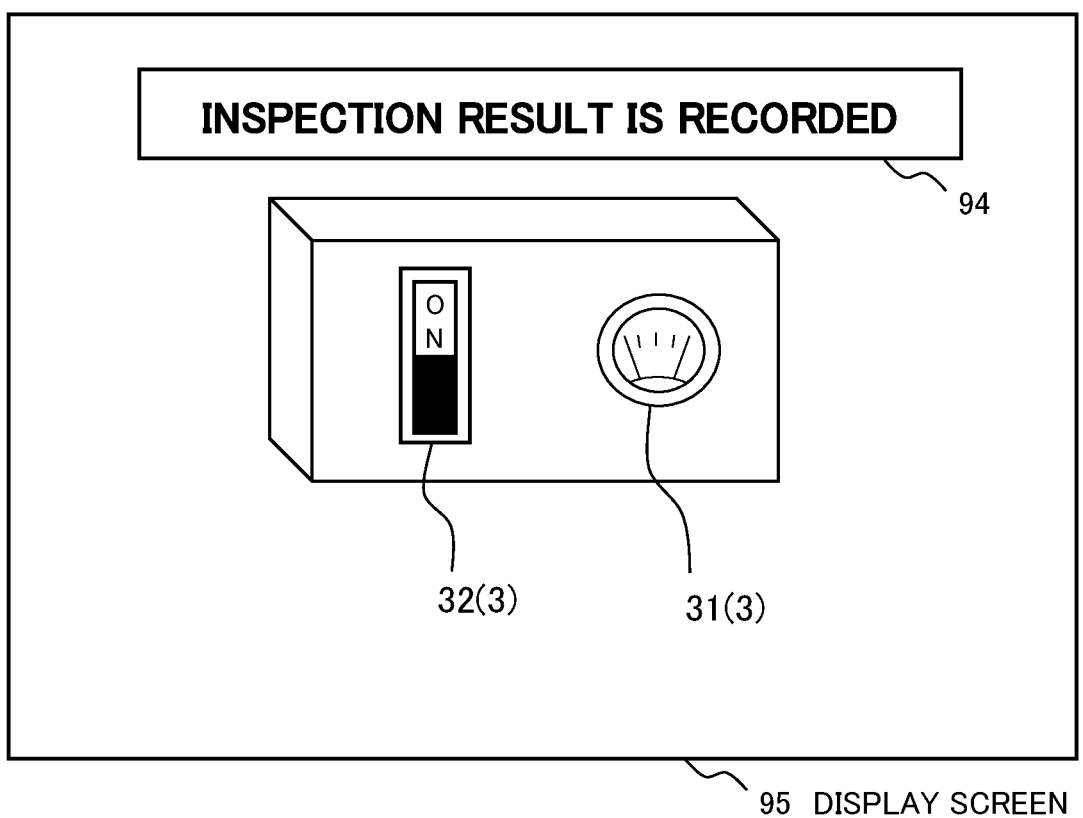
FIG. 11 is a diagram illustrating another example of a display screen displayed by the display unit.

FIG. 10 is a diagram illustrating an example of a display screen 93 displayed by the display unit 160. The display screen 93 displays an image including a thermometer 31 and a switch 32 as an image included in image data acquired by the acquisition unit 120. FIG. 11 is a diagram illustrating an example of a display screen 95 including recording completion information 94, the display screen being displayed by the display unit 160. As illustrated in FIG. 11, the display screen 95 includes the display screen 93 illustrated in FIG. 10 and the recording completion information 94. Thus, the display control unit 150 may superimpose the recording completion information 94 on the image included in the image data acquired by the acquisition unit 120 and cause the display unit 160 to display the resulting image. Consequently, the worker 2 performing inspection work can grasp that information about an inspection result of the inspection target 3 is recorded. The display control unit 150 may cause the recording completion information 94 to be displayed for the entire inspection target 3 included in the display screen 95 as illustrated in FIG. 11, or may cause the information to be displayed for each of the thermometer 31 and the switch 32.

As described above, the inspection assistance device 100 according to the present example embodiment can efficiently record data valid as an inspection result of an inspection target. Consequently, for example, even when image data, information about an inspection result, or the like is falsified due to a poor attitude of the worker 2 or the like, recording of the falsified data can be prevented.

Further, for example, a supervisor checking inspection work by use of recorded data can check data valid as an inspection result of an inspection target. Accordingly, the inspection assistance device 100 can more efficiently assist work related to inspection.

The acceptance unit 110 has been described to be configured to accept the inspection target information 60 stored in the storage device 300, according to the present example embodiment. However, the acceptance unit 110 may be configured to, for example, accept information about an inspection target 3 input by a supervisor inspecting an inspection result, or the like through an input device. With such a configuration, for example, even in case of an unexpected inspection, the recording control unit 130 can record information about an inspection result of an inspection target 3 and information about the inspection target 3 in association with each other.

Further, a case of each record in the inspection target information 60 illustrated in FIG. 6 being prepared for each inspection target 3 has been described as an example, according to the present example embodiment. However, the inspection target information 60 is not limited to the above. FIG. 12 is a diagram illustrating another example of information about an inspection target stored in the storage device 300. As illustrated in FIG. 12, inspection target information 121 includes an inspection item number 122, an inspection item 123, an inspection target name 124, and a required time 125. The required time 125 indicates a time set as a time required for inspection. The inspection target information 121 may include other information, similarly to the inspection target information 60.

Referring to FIG. 12, a record with an inspection item number 122 "3" includes a plurality of inspection items for a plurality of inspection targets 3, respectively. A number of inspection targets 3 included in the record with the inspection item number 122 "3" is two.

When a record in the inspection target information 121 thus includes a plurality of inspection targets 3, the recording control unit 130 may determine whether or not a number of inspection targets 3 included in information accepted by the acceptance unit 110 matches a number of recognized inspection targets 3. Then, when the numbers match, the recording control unit 130 may record information about an inspection result of each inspection target 3 and the information about the inspection target 3 in association with each other.

For example, when information about an inspection target 3 acquired by the acceptance unit 110 is the record with the inspection item number 122 "3," the recording control unit 130 identifies a number of inspection targets 3, based on the information about the inspection target 3 acquired by the acceptance unit 110. In this example, the recording control unit 130 identifies that the number of the inspection targets 3 is 2. Then, the recording control unit 130 determines whether or not a number of inspection targets 3 recognized as a result of the recognition in Step S85 matches the identified number, and performs the processing in Step S86 when the numbers match and performs the processing in Step S84 when the numbers do not match.

Figure 13:
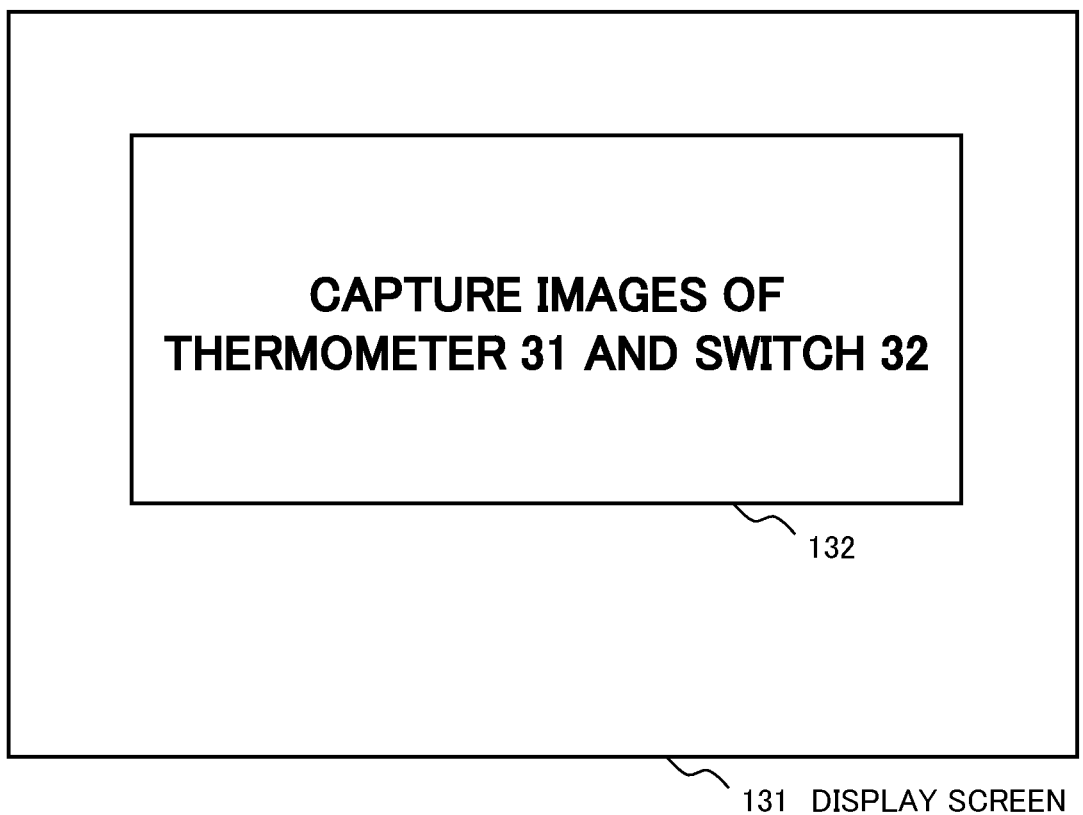
FIG. 13 is a diagram illustrating another example of a display screen displayed by the display unit.

An example of a display screen displayed on the display unit 160 on the wearable glasses 5 in Step S84 at this time will be described with reference to FIG. 13. FIG. 13 is a diagram illustrating an example of a display screen 131 displayed on the display unit 160. When a number of inspection targets 3 included in information accepted by the acceptance unit 110 does not match a number of recognized inspection targets 3, the display control unit 150 causes the display unit 160 to display the display screen 131 including information 132 prompting the worker 2 to capture images of a plurality of inspection targets. The display control unit 150 may display information indicating that the numbers of the inspection targets 3 are different.

Consequently, the inspection assistance device 100 can prevent information about an inspection result from being mistakenly recorded when a number of inspection targets 3 is not satisfied.

Further, referring to FIG. 12, a required time 125 in a record with an inspection item number 122 "5" is "2 MINUTES." When a required time is thus included in inspection target information, the recording control unit 130 determines whether or not a time required for inspection is within the required time. Then, when the time required for inspection is within the required time, the recording control unit 130 may record information about an inspection result of the inspection target 3 and information about the inspection target 3 in association with each other.

For example, when information about an inspection target 3 acquired by the acceptance unit 110 is the record with the inspection item number 122 "5," the recording control unit 130 identifies a time required for inspection from image data acquired by the acquisition unit 120. When the image data are dynamic image data, an identification method of a time required for inspection may be a method of identifying a length of an imaging time or another method. It is assumed herein that a time required for inspection is a length of an imaging time.

Further, for example, processing of identifying a time required for inspection may be performed before Step S85 or may be performed after Step S86. It is assumed herein that the processing of identifying a time required for inspection is performed before Step S85.

In this example, the recording control unit 130 determines whether or not a time required for inspection is within "2

MINUTES" indicated by the required time included in the information about the inspection target 3. Then, the recording control unit 130 performs the processing in Step S85 when the time required for inspection is within 2 minutes, and performs the processing in Step S84 when the time is not within 2 minutes.

Figure 14:
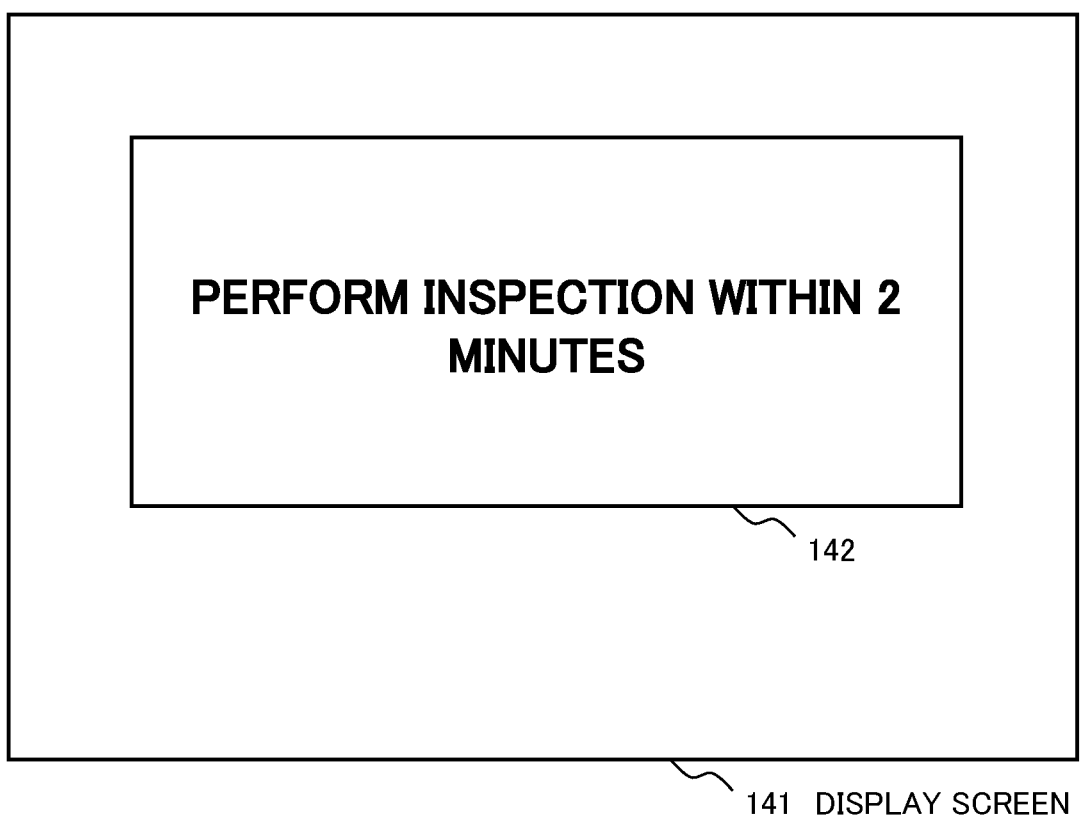
FIG. 14 is a diagram illustrating another example of a display screen displayed by the display unit.

An example of a display screen displayed on the display unit 160 on the wearable glasses 5 in Step S84 at this time will be described with reference to FIG. 14. FIG. 14 is a diagram illustrating an example of a display screen 141 displayed on the display unit 160. When a time required for inspection is not within a required time included in information about an inspection target 3, the display control unit 150 causes the display unit 160 to display the display screen 141 including information 142 prompting the worker 2 to perform inspection work within the required time included in the information about the inspection target 3. The display control unit 150 may display information indicating that the time required for inspection is not within the required time included in the information about the inspection target 3.

Consequently, for example, when the worker 2 performs inspection work in a slow-moving manner, a time required for inspection may become longer than the set required time. In such a case, the inspection assistance device 100 may give the worker 2 an instruction to promptly perform inspection work.

Further, referring to FIG. 12, a required time 125 is "5 MINUTES," and a number of inspection targets 3 is three in a record with an inspection item number 122 "4." In such a case, the recording control unit 130 may perform both of determination of whether or not a time required for inspection is within the required time and determination of whether or not a number of inspection targets 3 included in information accepted by the acceptance unit 110 matches a number of recognized inspection targets 3.

Further, as described in a record with an inspection item number 122 "6," an inspection target may be a structure such as a bridge.

Further, when the recording control unit 130 cannot recognize a target included in image data in Step S85, the display control unit 150 may perform the processing in Step S84. For example, there may be a case that the worker 2 does not perform work and looks at another place, the worker 2 looks at an inspection target 3 from a place distant from the inspection target 3, or an inspection target 3 cannot be recognized from image data. In such a case, the display control unit 150 may cause the display unit 160 to display the display screen 92 as illustrated in FIG. 9.

FIG. 15 is a diagram illustrating an example of recorded information 151 recorded in the recording unit 140. The recorded information 151 is acquired by associating inspection result information 156 with each record in the inspection target information 121 illustrated in FIG. 12. The inspection result information 156 illustrated in FIG. 15 may be an inspection result itself or data by which the inspection result can be acquired, similarly to the aforementioned inspection result information 75.

Further, as illustrated in FIG. 15, the inspection result information 156 may include a plurality of pieces of data. Further, for example, a record with an inspection item number 122 "4" includes inspection items for a plurality of inspection targets 3. When there are a plurality of inspection targets 3, there may be a plurality of pieces of data (for example, image data) by which inspection results can be acquired. In this case, the recorded information 151 may identify information about inspection results from the plurality of pieces of image data and record the information as inspection result information 156.

Further, for example, the imaging device 200 may start image capture when the worker 2 starts input to an input device built into the imaging device 200, and the imaging device 200 may end the image capture when the worker 2 inputs an instruction to end. Then, the imaging device 200 may generate image data representing an image captured from the start to the end.

Figure 16:
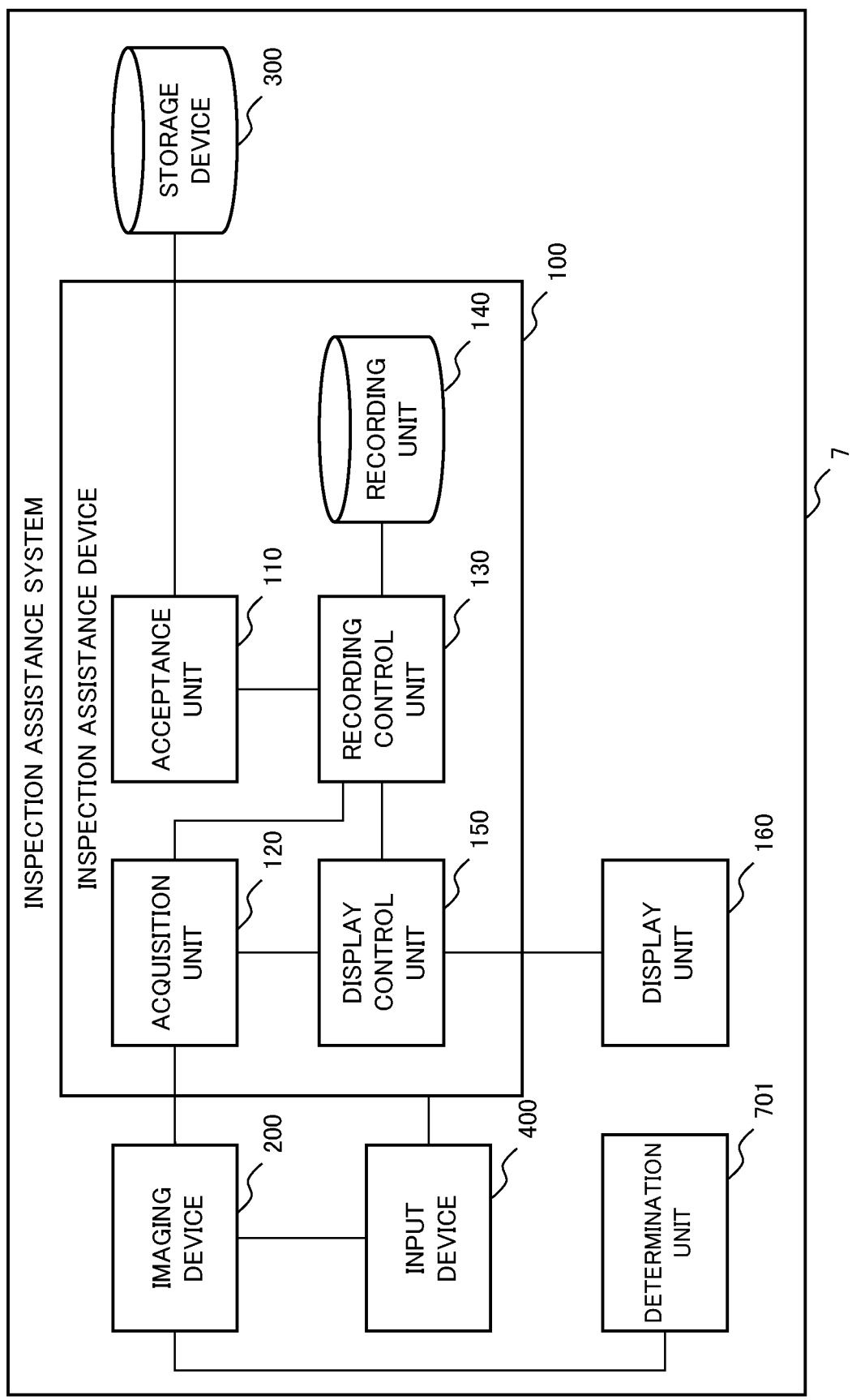
FIG. 16 is a diagram illustrating another configuration example of an inspection assistance system including the inspection assistance device according to the second example embodiment.

Further, the imaging device 200 may generate image data in accordance with another instruction. A configuration of an inspection assistance system in this case will be described with reference to FIG. 16. FIG. 16 is a diagram illustrating a configuration example of an inspection assistance system 7. As illustrated in FIG. 16, the inspection assistance system 7 includes the inspection assistance system 4 illustrated in FIG. 4, an input device 400, and a determination unit 701.

The input device 400 accepts input from the worker 2 and another user. The input device 400 may be included in the imaging device 200, may be included in the inspection assistance device 100, or may be included in each. Further, for example, the input device 400 is provided by a keyboard, a button, a touch panel, or a microphone but is not limited to the above. For example, when the input device 400 is included in the imaging device 200, the input device 400 may be a button for accepting instructions to start and end image capture. Further, the input device 400 may be a device into which input information in accordance with which the acceptance unit 110 accepts information about an inspection target 3 is input. Further, the input device 400 may be a device used by the worker 2 when inputting an inspection result.

The determination unit 701 determines start and end timings of image data generated by the imaging device 200. For example, when an image temporarily saved by the imaging device 200 satisfies a predetermined condition, the determination unit 701 instructs the imaging device 200 to start image capture. Similarly, when the image satisfies another predetermined condition, the determination unit 701 instructs the imaging device 200 to end the image capture. Consequently, the imaging device 200 can generate image data of an image captured in accordance with the instructions.

For example, the determination unit 701 may instruct the imaging device 200 to start image capture when detecting that a viewpoint of the worker 2 stops from an image temporarily saved by the imaging device 200 and may instruct the imaging device 200 to end the image capture when detecting that the viewpoint moves. Further, for example, the determination unit 701 may instruct the imaging device 200 to start image capture when detecting that a predetermined action is performed by the worker 2 from an image temporarily saved by the imaging device 200 and may instruct the imaging device 200 to end the image capture when detecting that the predetermined action is subsequently performed again. For example, a predetermined action of the worker 2 may include an action of the worker 2 writing a predetermined character with a finger but is not particularly limited. Further, for example, the determination unit 701 may instruct the imaging device 200 to start image capture when recognizing an arbitrary inspection target from an image temporarily saved by the imaging device 200 and may instruct the imaging device 200 to end the image capture when not recognizing any inspection target. An arbitrary inspection target may be an inspection target 3 being a target of inspection work or any of inspection targets 3 included in the storage device 300.

The determination unit 701 may be included in the imaging device 200 or may be included in the inspection assistance device 100. By the inspection assistance system 7 including the determination unit 701, an amount of captured image data can be reduced compared with a case of continuing image capture.

Further, identification of a time required for inspection may be performed by the determination unit 701. For example, when detecting that image data acquired by the acquisition unit 120 include a plurality of predetermined actions, the determination unit 701 may identify a time period from an imaging time when one of the plurality of predetermined actions is detected to an imaging time when the other predetermined action is detected as a time required for inspection. Further, for example, in a case of the input device 400 being a microphone, when detecting a plurality of predetermined voices from collected voice data, the determination unit 701 may identify a time period from a time when one of the plurality of predetermined voices is detected to a time when the other predetermined voice is detected as a time required for inspection. Further, a time required for inspection may be identified based on both of information input through the input device 400 and image data. By thus identifying a time required for inspection, accuracy of a time required for inspection calculated by the inspection assistance device 100 can be improved.

Hardware Configuration

Figure 17:
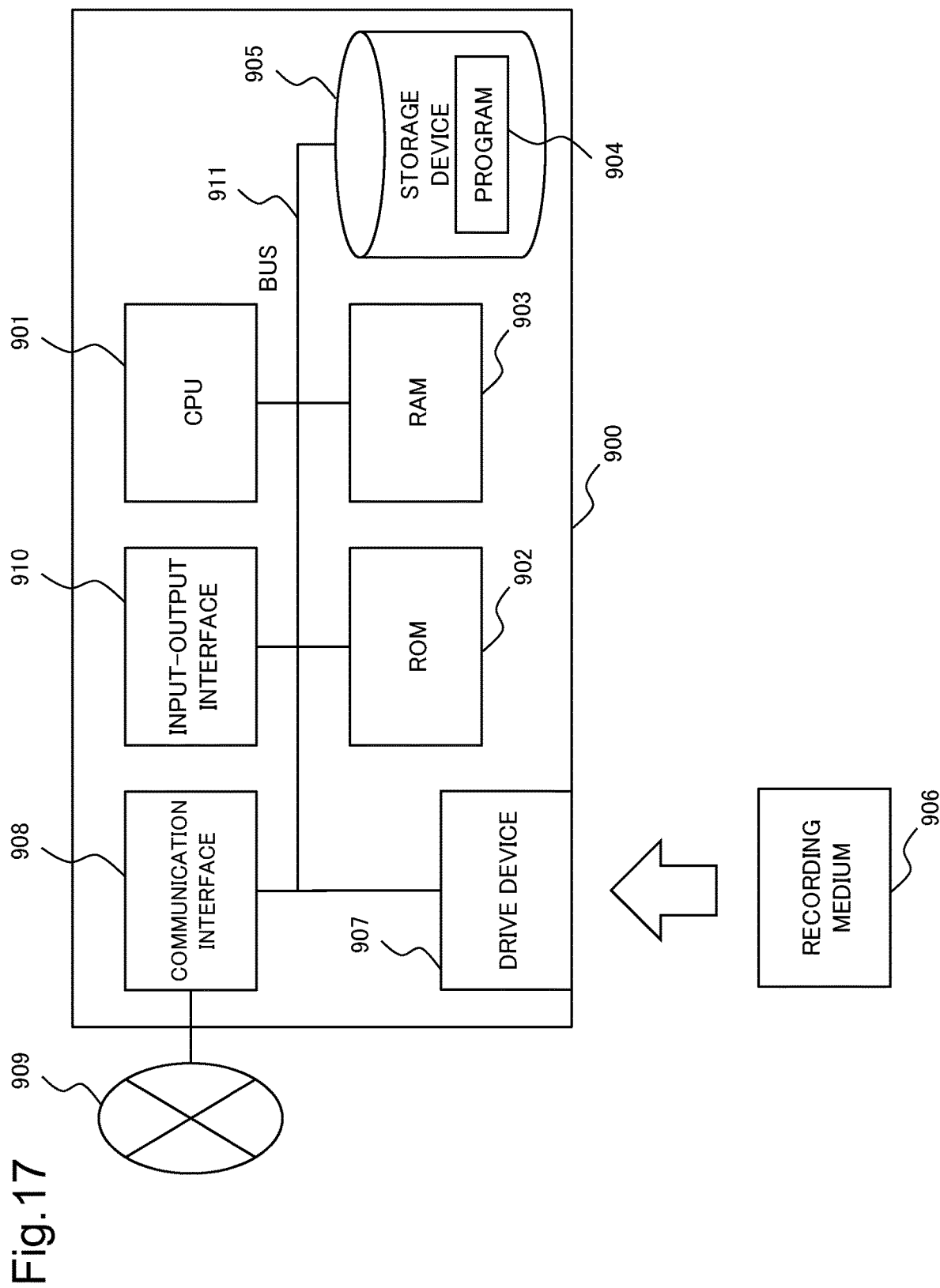
FIG. 17 is a diagram exemplarily illustrating a hardware configuration of a computer (information processing device) capable of providing each example embodiment.

Each component in the inspection assistance device (10, 100) according to each example embodiment of the present disclosure represents a function-based block. For example, a part or the whole of each component in the inspection assistance device (10, 100) is provided by an arbitrary combination of an information processing device 900 and a program as illustrated in FIG. 17. FIG. 17 is a block diagram illustrating an example of a hardware configuration of the information processing device 900 providing each component in the inspection assistance device (10, 100). An example of the information processing device 900 includes the following configuration.

- A central processing unit (CPU) 901
- A read only memory (ROM) 902
- A random access memory (RAM) 903
- A program 904 loaded on the RAM 903
- A storage device 905 storing the program 904
- A drive device 907 for reading and writing of a recording medium 906
- A communication interface 908 connected to a communication network 909
- An input-output interface 910 inputting and outputting data
- A bus 911 connecting each component Each component in the inspection assistance device (10, 100) according to each example embodiment is provided by the CPU 901 acquiring and executing the program 904 providing the functions of the component. For example, the program 904 providing the function of each component in the inspection assistance device (10, 100) is previously stored in the storage device 905 or the ROM 902, and is read by the CPU 901 as needed. The program 904 may be provided for the CPU 901 through the communication network 909, or may be previously stored in the recording medium 906, be read by the drive device 907, and be provided for the CPU 901.

There are various modified examples for a method of providing the inspection assistance device (10, 100). For example, the inspection assistance device (10, 100) may be provided by an arbitrary combination of an information processing device 900 and a program, the combination being separate for each component. Further, a plurality of components included in the inspection assistance device (10, 100) may be provided by an arbitrary combination of a single information processing device 900 and a program.

Further, a part or the whole of each component in the inspection assistance device (10, 100) is provided by another general-purpose or dedicated circuit, a processor, or the like, or a combination thereof. The above may be configured with a single chip or may be configured with a plurality of chips connected through a bus.

A part or the whole of each component in the inspection assistance device (10, 100) may be provided by a combination of the aforementioned circuit or the like, and a program.

When a part or the whole of each component in the inspection assistance device (10, 100) is provided by a plurality of information processing devices, circuits, or the like, the plurality of information processing devices, circuits, or the like may be arranged in a concentrated manner or be arranged in a distributed manner. For example, the respective information processing devices, circuits, or the like may be provided in a form of being connected with one another through a communication network, such as a client-server system, a cloud computing system, or the like.

The respective aforementioned example embodiments are preferred example embodiments of the present disclosure, and the scope of the present disclosure is not limited to the respective aforementioned example embodiments; and a person skilled in the art may make example embodiments which include various changes through modifying and substituting the respective aforementioned example embodiments without departing from the spirit and scope of the present disclosure.

The aforementioned example embodiments may also be described in part or in whole as the following Supplementary Notes but are not limited thereto.

Supplementary Note 1

An inspection assistance device including:

an acceptance means configured to accept information about an inspection target;

an acquisition means configured to acquire image data captured by an imaging device; and a recording control means configured to, when an imaging time of the image data is within a predetermined time range with reference to an acceptance time of the information, and an inspection target indicated by the accepted information matches an inspection target recognized from the acquired image data, record information about an inspection result of the inspection target and information about the inspection target in association with each other.

Supplementary Note 2

The inspection assistance device according to Supplementary Note 1, further including a display control means configured to cause a display unit to display recording result information according to a result of recording by the recording control means.

Supplementary Note 3

The inspection assistance device according to Supplementary Note 2, wherein, when the imaging time is not within the predetermined time range or an inspection target indicated by the accepted information does not match the recognized inspection target, the display control means causes the display unit to display a screen including an instruction to prompt image capture of the inspection target.

Supplementary Note 4

The inspection assistance device according to Supplementary Note 3, wherein the display control means causes a screen including an instruction to prompt image capture of the inspection target to be displayed until the imaging time is within the predetermined time range and an inspection target indicated by the accepted information matches the recognized inspection target.

Supplementary Note 5

The inspection assistance device according to any one of Supplementary Notes 1 to 4, wherein the accepted information is information about a plurality of the inspection targets, and, when a number of one or more of the inspection targets identified from the accepted information matches a number of one or more recognized inspection targets, the recording control means records information about an inspection result of the inspection target and information about the inspection target in association with each other.

Supplementary Note 6

The inspection assistance device according to any one of Supplementary Notes 1 to 5, wherein, when a time required for inspection is within a predetermined required time, the recording control means records information about an inspection result of the inspection target and information about the inspection target in association with each other.

Supplementary Note 7

The inspection assistance device according to Supplementary Note 6, wherein a time required for the inspection is identified based on the acquired image data.

Supplementary Note 8

An inspection assistance method including:

accepting information about an inspection target;

acquiring image data captured by an imaging device; and, when an imaging time of the image data is within a predetermined time range with reference to an acceptance time of the information, and an inspection target indicated by the accepted information matches an inspection target recognized from the acquired image data, recording information about an inspection result of the inspection target and information about the inspection target in association with each other.

Supplementary Note 9

The inspection assistance method according to Supplementary Note 8, further including causing a display unit to display recording result information according to a result of the recording.

Supplementary Note 10

A computer-readable non-transitory recording medium having a program recorded thereon, the program causing a computer to execute:

processing of accepting information about an inspection target; processing of acquiring image data captured by an imaging device; and, processing of, when an imaging time of the image data is within a predetermined time range with reference to an acceptance time of the information, and an inspection target indicated by the accepted information matches an inspection target recognized from the acquired image data, recording information about an inspection result of the inspection target and information about the inspection target in association with each other.

Supplementary Note 11

The recording medium according to Supplementary Note 10, further causing a computer to execute processing of causing a display unit to display recording result information according to a result of the recording.

REFERENCE SIGNS LIST

1 Wearable glasses
2 Worker
3 Inspection target
4 Inspection assistance system
5 Wearable glasses
10 Inspection assistance device
11 Acceptance unit
12 Acquisition unit
13 Recording control unit
100 Inspection assistance device
110 Acceptance unit
120 Acquisition unit
130 Recording control unit
140 Recording unit
150 Display control unit
160 Display unit
200 Imaging device
300 Storage device
400 Input device
701 Determination unit

The invention claimed is:

1. An inspection assistance device comprising:

at least one memory storing instructions; and at least one processor connected to the at least one memory and configured to execute the instructions to:

accept information about an inspection target;

acquire image data captured by an imaging device; and when an imaging time of the image data is within a predetermined time range with reference to an acceptance time of the information, and an inspection target indicated by the accepted information matches an inspection target recognized from the acquired image data, record information about an inspection result of the inspection target and information about the inspection target in association with each other.

2. The inspection assistance device according to claim 1, wherein the at least one processor is configured to execute the instructions to cause a display to display recording result information according to a result of the recording.

3. The inspection assistance device according to claim 2, wherein the at least one processor is configured to execute the instructions to, when the imaging time is not within the predetermined time range or an inspection target indicated by the accepted information does not match the recognized inspection target, cause the display to display a screen including an instruction to prompt image capture of the inspection target.

4. The inspection assistance device according to claim 3, wherein the at least one processor is configured to execute the instructions to cause a screen including an instruction to prompt image capture of the inspection target to be displayed until the imaging time is within the predetermined time range and an inspection target indicated by the accepted information matches the recognized inspection target.

5. The inspection assistance device according to claim 1, wherein the accepted information is information about a plurality of the inspection targets, and, the at least one processor is configured to execute the instructions to, when a number of one or more of the inspection targets identified from the accepted information matches a number of one or more recognized inspection targets, record information about an inspection result of the inspection target and information about the inspection target in association with each other.

6. The inspection assistance device according to claim 1, wherein the at least one processor is configured to execute the instructions to, when a time required for inspection is within a predetermined required time, record information about an inspection result of the inspection target and information about the inspection target in association with each other.

7. The inspection assistance device according to claim 6, wherein a time required for the inspection is identified based on the acquired image data.

8. An inspection assistance method comprising:
accepting information about an inspection target;
acquiring image data captured by an imaging device; and,
when an imaging time of the image data is within a predetermined time range with reference to an acceptance time of the information, and an inspection target indicated by the accepted information matches an inspection target recognized from the acquired image data, recording information about an inspection result of the inspection target and information about the inspection target in association with each other.

9. The inspection assistance method according to claim 8, further comprising
causing a display to display recording result information according to a result of the recording.

10. A computer-readable non-transitory recording medium having a program recorded thereon, the program causing a computer to execute:
processing of accepting information about an inspection target;
processing of acquiring image data captured by an imaging device; and,
processing of, when an imaging time of the image data is within a predetermined time range with reference to an acceptance time of the information, and an inspection target indicated by the accepted information matches an inspection target recognized from the acquired image data, recording information about an inspection result of the inspection target and information about the inspection target in association with each other.

11. The recording medium according to claim 10, further causing a computer to execute
processing of causing a display to display recording result information according to a result of the recording.

* * * * *